United States Patent [19]

Whatley, Jr.

[11] Patent Number: 5,058,924
[45] Date of Patent: Oct. 22, 1991

[54] LIQUID STORAGE TANK WITH EQUIPMENT STORAGE COMPARTMENT

[75] Inventor: Lonnie B. Whatley, Jr., Ardmore, Okla.

[73] Assignee: Spade Leasing, Inc., Springer, Okla.

[21] Appl. No.: 482,861

[22] Filed: Feb. 22, 1990

[51] Int. Cl.<sup>5</sup> .............................................. B60P 3/22
[52] U.S. Cl. ................................... 280/837; 296/37.1; 296/24.1
[58] Field of Search ............... 280/836, 837, 838, 839; 296/25, 37.1, 24.1

[56] References Cited

U.S. PATENT DOCUMENTS

| | | | |
|---|---|---|---|
| 1,373,435 | 4/1921 | Kramer . | |
| 1,466,175 | 8/1923 | Kramer . | |
| 3,054,525 | 9/1962 | Silvis | 220/16 |
| 3,163,434 | 12/1964 | Krueger | 280/5 |
| 4,277,095 | 7/1981 | Barruw | 296/24.1 |
| 4,343,481 | 8/1982 | van der Lely | 280/837 |

FOREIGN PATENT DOCUMENTS 169406  9/1921  United Kingdom ................ 280/838

Primary Examiner—Charles A. Marmor
Assistant Examiner—Alan M. Kagen
Attorney, Agent, or Firm—Laney, Dougherty, Hessin & Beavers

[57] ABSTRACT

A transport tank for storing and dispensing a liquid which includes a forward liquid compartment and a rearwardly positioned equipment storage compartment. The liquid compartment is of substantially right parallelepiped configuration. The equipment storage compartment is of inverted L-shaped configuration and includes a forwardly extending upper portion which projects above the level of the roof of the liquid compartment. This configuration allows the tank to be more utilitarian without in any way interfering with its over-the-road transport when it is empty. The equipment storage compartment has a rear wall, and is accessed by at least one door in the rear wall. It is separated from the liquid storage compartment by a vertically extending rear partition wall and a horizontally extending shelf member which extends between and interconnects the rear partition wall and the roof of the liquid compartment.

3 Claims, 2 Drawing Sheets

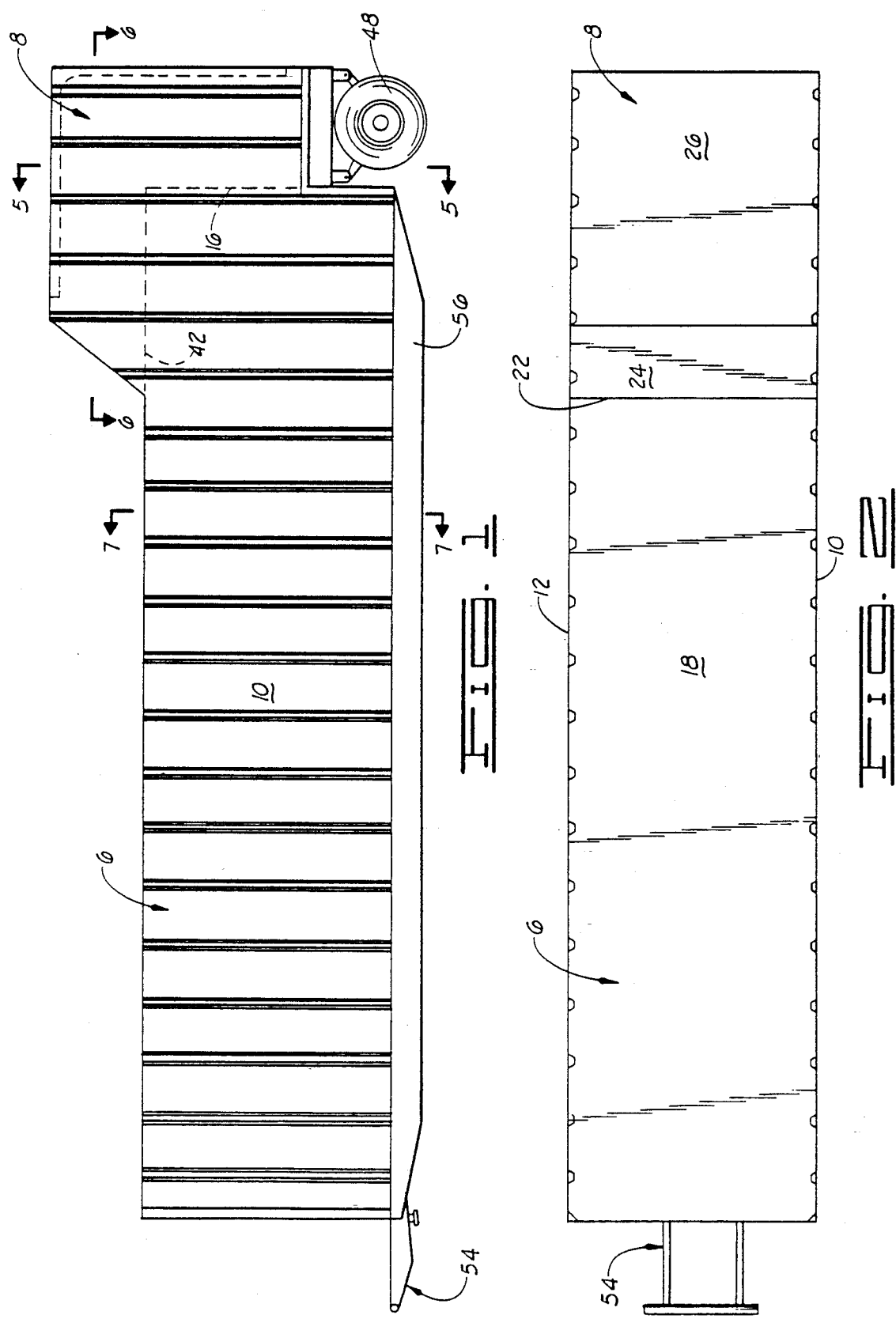

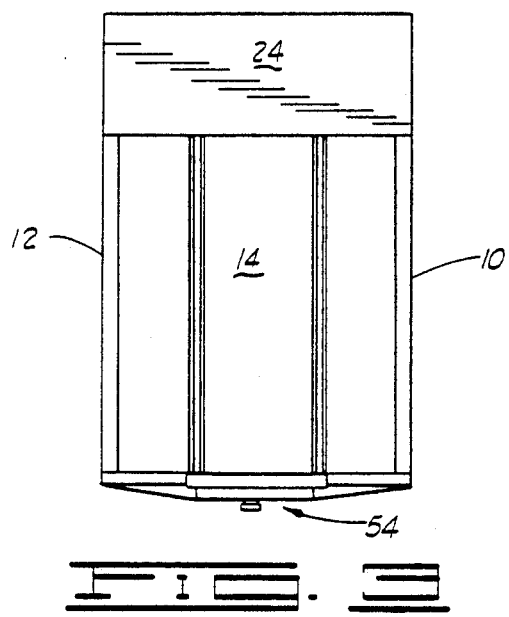
FIG. 3
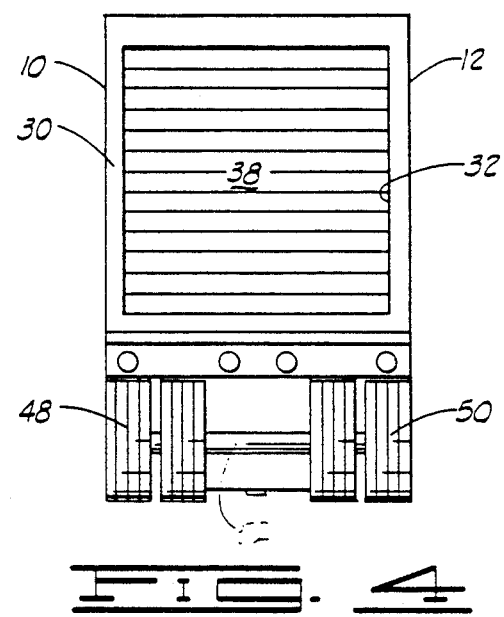
FIG. 4
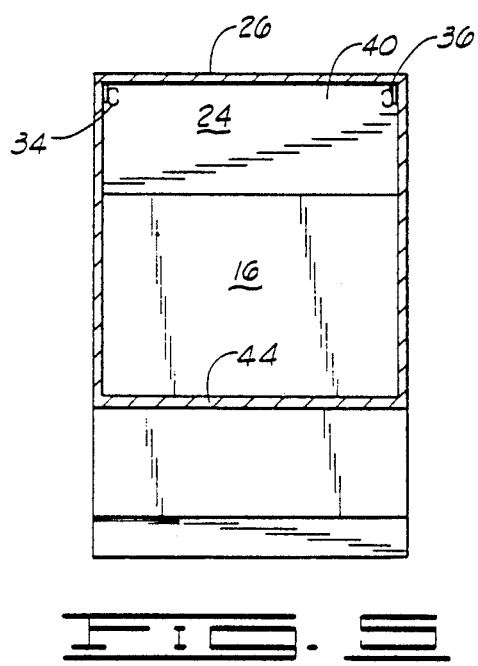
FIG. 5
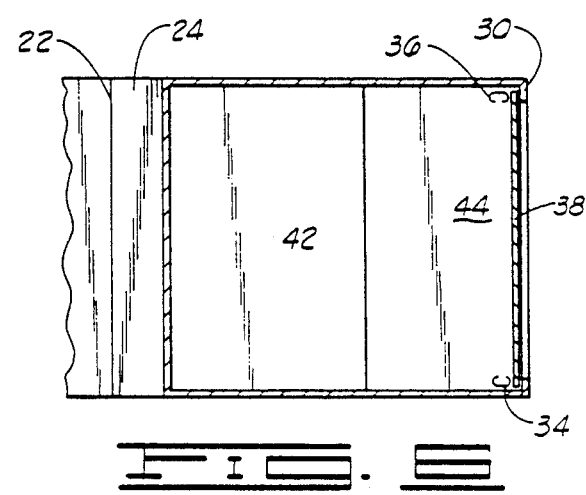
FIG. 6
FIG. 7
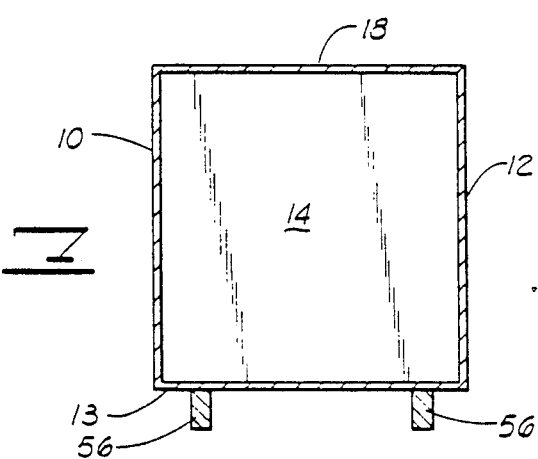

LIQUID STORAGE TANK WITH EQUIPMENT STORAGE COMPARTMENT

BRIEF DESCRIPTION OF THE PRESENT INVENTION

The present invention provides a liquid storage tank of the type which is commonly used for storing very large volumes of fracturing fluid, or similar liquids, or slurry materials, in a semi-permanent location while these fluids are used in well treatment and the like. After the tank has been emptied, or substantially emptied, of its liquid content, it is then lifted at one end for connection to a towing vehicle, such as a tractor having a fifth wheel, and is then towed from one location of use to another, where it is re-filled and re-used as it sits on skids which support the tank on the ground.

The liquid storage tank of this invention is uniquely constructed in providing an inverted L-shaped equipment storage compartment at the rear of the tank. The equipment storage compartment is separated by partitions from a liquid compartment in the forward end of the tank ahead of the equipment storage compartment.

Broadly described, the tank of the invention includes a liquid compartment in the forward portion of the tank, with this liquid compartment being of substantially right parallelepiped configuration. At the rear of the tank, the inverted L-shaped equipment storage compartment has a portion which projects above the ceiling or roof of the liquid compartment. An inset step is provided in the liquid storage tank immediately beneath the equipment storage compartment at the rear of the tank. The inset step accommodates axle-mounted, ground-engaging wheels by which the liquid storage tank is supported on the highway as it is transported following dispensation of the liquid therefrom.

The equipment storage compartment is accessible through a roll-up, vertically movable segmented door formed in the rear wall of the equipment storage compartment. The upwardly protuberant and forwardly extending portion of the equipment storage compartment does not interfere with the over-the-road transport of the liquid storage tank, since at that time, the forward portion of the tank is lifted upwardly to connect the tank to a towing vehicle, and this brings the forward portion of the tank only upwardly to approximately the same vertical level as the upwardly protuberant part of the equipment storage compartment at the rear thereof.

An important object of the invention is to provide a liquid storage tank having a shape which permits large quantities of valves, hoses, tools and other equipment to be stored at the rear of the tank where it will exert most of its weight on the over-the-road, ground-contacting wheels upon which the tank is supported during transport. Moreover, by locating the tools and equipment at this location, a hump or protuberant portion can be formed at the rear upper side of the tank to accommodate large amounts of equipment without interferring with over-the-road transport of the tank as a result of an increase in the overall height of the tank during such transport.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of the fluid storage tank with rear compartment of the present invention.

FIG. 2 is a top plan view of the fluid storage tank as shown in FIG. 1.

FIG. 3 is a front elevation view of the fluid storage tank.

FIG. 4 is a rear elevation view of the fluid storage tank as it appears when viewed from the rear.

FIG. 5 is a sectional view along line 5—5 of FIG. 1.

FIG. 6 is a sectional view taken along line 6—6 of FIG. 1.

FIG. 7 is a sectional view taken along line 7—7 of FIG. 1.

DETAILED DESCRIPTION OF A PREFERRED EMBODIMENT OF THE INVENTION

Referring to the drawings, the liquid storage tank of the invention is divided into a liquid compartment 6 located at the forward end of the liquid storage tank, and an equipment storage compartment located at the rear of the liquid storage tank and denominated generally by reference numeral 8. The forwardly located liquid compartment 6 includes a pair of opposed, substantially parallel side walls 10 and 12, a forward liquid compartment floor or bottom wall 13 (see FIG. 7), a forward wall 14 and a rear partition wall 16. A forward liquid compartment ceiling or top wall 18 is provided as illustrated in FIG. 2, and extends from the forward end of the storage tank to a point well to the rear of the forward end of the storage tank to a location denominated by reference numeral 22. At this point, rearwardly and upwardly extending, inclined storage compartment break wall 24 is provided, and functions as an upwardly inclined extension of the top wall 18 located over at the forward end of the tank. The upwardly extending inclined storage compartment break wall 24 forms a part of the roof of the storage tank of the invention, and also forms an upper forward boundary for the equipment storage compartment 8.

The equipment storage compartment 8 includes, in addition to the break wall 24, a substantially horizontally extending top wall 26 which lies in a plane which extends substantially parallel to the plane in which the forward liquid compartment roof 18 lies, but is at an elevation higher than the liquid compartment roof. The top wall 26 of the equipment storage compartment projects from the break wall 24 rearwardly to the rear end of the liquid storage tank.

At the rear of the liquid storage tank, and forming the rear of the equipment storage compartment 8, is a vertically extending rear wall 30. The equipment storage compartment rear wall 30 extends substantially parallel to the rear partition wall 16, as well as parallel to the forward wall 14 of the liquid storage tank. The equipment storage compartment rear wall 30 defines a large centralized opening designated generally by reference numeral 32. At the opposite sides of this opening 32 are a pair of vertically extending, substantially parallel tracks 34 and 36. The tracks 34 and 36 function to guide the movement of an access door 38. The access door 38 is a segmented, roll-up door which opens by lifting the whole door upwardly as it collapses and bends about the hinge lines delineating the segmented portions of the door. The door is stored, when open, in a space 40 located at the upper side of the equipment storage compartment just beneath the to wall 26.

The equipment storage compartment 8 further includes a forwardly projecting space which is defined between the top wall 26, the break wall 24, and a substantially horizontal extending shelf floor 42. The shelf floor 42 extends substantially horizontally and parallel to the plane of the forward liquid compartment bottom wall or floor 13. It is spaced upwardly from the liquid compartment floor and is in substantially coplanar horizontal alignment with the forward liquid compartment top wall or roof 18. The floor of the equipment storage compartment 8 is denominated by reference numeral 44, and is perhaps best illustrated in FIGS. 5 and 6 of the drawings. It will be noted that the equipment storage compartment floor 44 lies in a plane which is spaced upwardly from the plane of the liquid compartment floor or bottom wall 13.

It will be perceived when reference is made to FIGS. 1 and 5 of the drawings that the effect of this construction is to form a substantially inset step or well located at the rear of the liquid storage tank and beneath the equipment storage compartment 8. In this inset or step, ground-engaging wheels 48 and 50 of the invention are mounted on a suitable axle 52 and function to support the liquid storage tank at the rear thereof for over-the-road transport. In order to facilitate such transport, the liquid storage tank has a forwardly extending tongue or towing beam 54 which enables the fluid storage tank to be coupled to a suitable towing vehicle, such as a tractor vehicle having a fifth wheel thereon to which the liquid storage tank is coupled.

When the liquid storage tank is to be rested upon the ground, or other supporting surface such as a concrete pad, for periodic or continuous use of liquid stored therein, it can rest upon a pair of skid beams 56 secured to the underside of the forward liquid compartment floor or bottom wall 13 as shown in FIGS. 1 and 7. In this case, as shown in FIG. 1, the supporting lower surface of the skid beams 56 is at a horizontal level which is at least as low as the lower surface of the wheels 48.

In the operation and use of the fluid storage tank with rear storage compartment constructed in accordance with the present invention, the liquid compartment 6, which occupies the predominant portion of the forward part of the liquid storage tank is usually filled with liquid at a time when the storage tank is supported on skid beams 56 in an "at rest" position. Suitable pipes and valves (no shown) project from the forward end of the storage tank, and many also extend from the rear side of the liquid compartment into the equipment storage compartment to permit the liquid contained therein to be dispensed from the liquid compartment as may be needed. During this time, the rather considerable weight of the contained liquid, in addition to the weight of the liquid storage tank, is rested upon the skids 56 and, in most instances, little or none of the weight is then taken by the ground-engaging wheels 48 and 50.

It will be noted that at this time, the equipment storage compartment 8 is readily accessible through the access door 38 in the rear wall 30. Within this equipment storage compartment 8, hoses, conduit, wrenches, spare valves and other equipment necessary to maintain and operate the liquid storage compartment and indeed, the entire tank, can be stored. This compartment 8 can also be used to provide access to the interior of the liquid compartment 6 for cleaning purposes or even for removal of the stored liquid therefrom if this should be desired. The inverted L-shaped configuration of the equipment storage compartment 8 and the provision of the forwardly projecting chamber over the shelf floor 42 provides maximum storage and utility space at that location which takes advantage of the positional attitude of the entire liquid storage tank at a time when the tank is towed in over-the-road transport.

After the tank has been emptied, it will often be desirable to transport the tank from one location to another for re-filling and then re-use at the second location. When the tank is used in this manner, the towing tongue or hitch structure 54 is connected to a suitable towing vehicle. This will result in the forward end of the liquid storage tank being elevated substantially relative to the rear end thereof so that the tank slopes downwardly from its forward end toward its rear end. In this attitude, the forward end of the tank will be about the same vertical level height as the line of intersection of the storage compartment top wall 26 and the break wall 24. Both of these near equivalent levels are at a height such that the entire tank can pass safely beneath overpasses and the like. It will be apparent when considering this geometric relationship that it would not be possible to realize this ability if the inverted L-shaped or stepped equipment storage compartment were located at the forward end of the liquid storage tank. This shortcoming would arise because the vertical protuberance of the equipment storage compartment, when then elevated at the time of connection to the towing vehicle, would prevent the liquid storage tank from passing safely beneath many underpasses having limited clearance above the roofs of trucks, trailers and other vehicles passed thereunder.

Another important advantage of the provision of the equipment storage compartment 8 at the location depicted is that the weight of the stored equipment, including heavy valves, pipe sections, tools and the like at this location, places this weight over the ground-engaging wheels 48 and 50, and when the liquid storage compartment forwardly therefrom is empty, the weight at this location adds stability to the entire liquid storage tank as it is transported over-the-road at relatively high speeds.

The rearward and upward slope of the break wall 24, which is accentuated at a time when the forward end of the liquid storage tank is lifted for towing purposes, aids in streamlining the liquid storage tank so that it offers minimal wind resistance to forward movement at relatively high speeds.

Although a preferred embodiment of the invention has been herein described, it will be understood that various changes and innovations in the structures which are illustrated in the drawings, and which have been alluded to in the detailed description of such preferred embodiment can, in some cases, be changed substantially without departure from the basic principles which underlie the invention. Changes and innovations of this type are therefor deemed to be circumscribed by the spirit and scope of the invention, except as the same may be necessarily limited by the appended claims or reasonable equivalents thereof.

What is claimed is:

1. A liquid storage tank structure having a forward end and a rear end and further comprising:
    a generally rectangular parallelepiped liquid compartment at the forward end of said tank structure, said liquid compartment including:
        two opposed, substantially vertically extending parallel side walls;

a forward wall having a top;

a rear partition wall extending substantially parallel to said forward wall;

a forward liquid compartment floor; and p2 a forward liquid compartment ceiling extending rearwardly from said forward wall and secured to the top of said forward wall, and extending substantially parallel to said forward liquid compartment floor;

an equipment storage compartment adjacent the rear end of said storage tank structure, and located rearwardly from said liquid compartment, said equipment storage compartment being of substantially inverted L-shaped configuration and including:

a vertically extending equipment storage compartment rear wall at the rear of said storage tank structure having a top and extending substantially parallel to said forward wall and to the rear partition wall of said liquid compartment;

at least one access door in said equipment storage compartment rear wall;

a top wall projecting forwardly from the top of said storage compartment rear wall in a plane extending substantially parallel to, and spaced above, said forward liquid compartment ceiling;

a downwardly and forwardly sloping break wall extending between said forward liquid compartment ceiling and said storage compartment top wall and forming a part of the forward side of said equipment storage compartment, the line of intersection of said break wall and said storage compartment top wall being positioned at a height which is not higher than the height at which the top of said forward wall is located during over-the-road transport of said storage tank structure;

a substantially horizontally extending shelf floor spaced upwardly from the level of said forward liquid compartment floor and extending from said rear partition wall to said break wall; and a substantially horizontally extending storage compartment floor extending from said partition wall to said storage compartment rear wall at a level below said shelf floor and located at a higher vertical level than said forward liquid compartment floor, said storage compartment floor forming the upper side of an inset open well immediately adjacent, and rearwardly from the rear end of said liquid storage tank structure;

ground enabling wheels adapted to support said tank structure during over-the-road transport and secured to said storage tank structure in said inset open well at a location directly below said storage compartment floor at the rear end of said storage tank structure;

means for engaging a towing vehicle, with said engaging means secured to the forward wall of said storage tank structure at about the horizontal level of said forward liquid compartment floor; and skid beams secured below said storage tank structure on the lower side of said forward liquid compartment floor, said skid beams extending downwardly to a horizontal level which is at least as low as the lower side of said ground engaging wheels whereby said storage tank is primarily supported on said skid beams when said tank is not being towed in over-the-road transport.

2. A liquid storage tank structure as defined in claim 1 wherein said tank structure has an access door in said equipment storage compartment rear wall and said door is a segmented, roll-up door which is opened by forcing the entire door upwardly.

3. A liquid storage tank structure as defined in claim 1 wherein said means for coupling comprises a forwardly extending tongue adapted for connection to a fifth-wheel structure on a towing vehicle.

* * * * *

UNITED STATES PATENT AND TRADEMARK OFFICE
CERTIFICATE OF CORRECTION

PATENT NO. : 5,058,924

DATED : October 22, 1991

INVENTOR(S) : Lonnie B. Whatley, Jr.

It is certified that error appears in the above-identified patent and that said Letters Patent is hereby corrected as shown below:

In Column 2, line 68, delete "to" and insert -top-.

In Column 3, line 48, delete "no" and insert -not-.

In Column 5, line 4, delete "p2" and begin another paragraph beginning with the words "a forward".

In Column 6, line 12, delete "enabling" and insert -engaging-.

Signed and Sealed this

Twenty-third Day of February, 1993

Attest:

STEPHEN G. KUNIN

Attesting Officer

Acting Commissioner of Patents and Trademarks